C. C. FARMER.
SAFETY CAR CONTROL EQUIPMENT.
APPLICATION FILED MAR. 26, 1920.
1,403,757.
Patented Jan. 17, 1922.
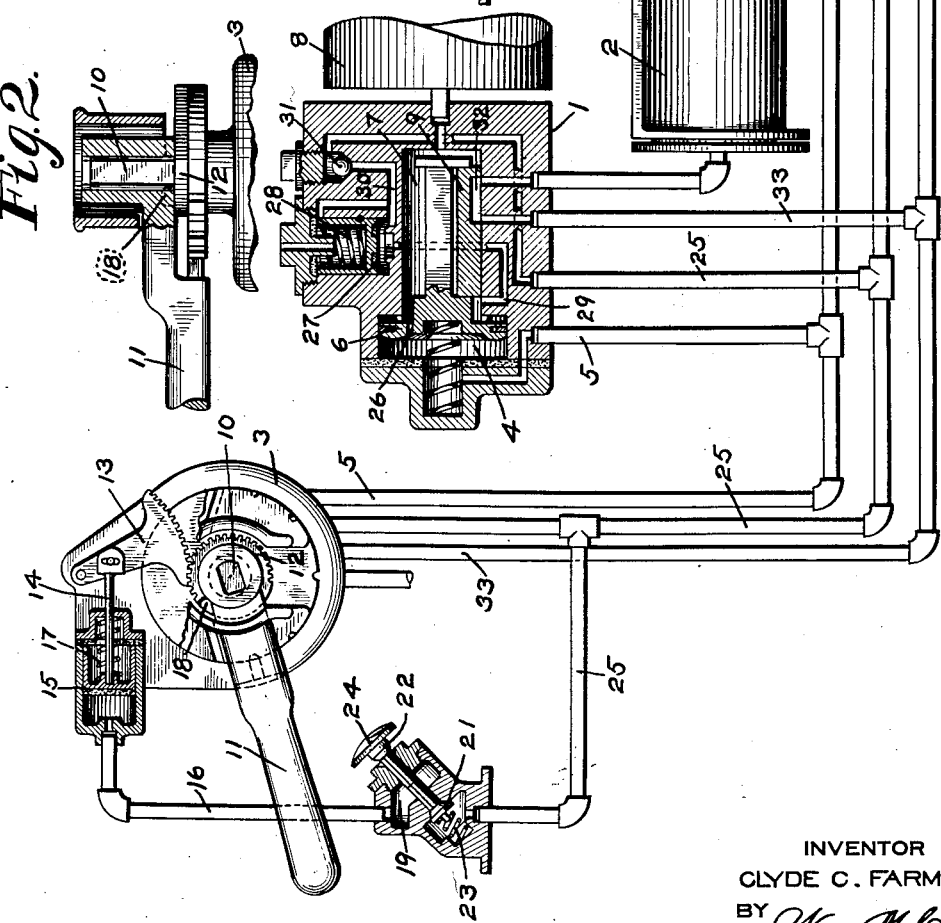
INVENTOR
CLYDE C. FARMER
BY Wm. M. Cady
ATTORNEY

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY-CAR-CONTROL EQUIPMENT.

1,403,757. Specification of Letters Patent. Patented Jan. 17, 1922.

Application filed March 26, 1920. Serial No. 368,908.

*To all whom it may concern:*

Be it known that I, CLYDE C. FARMER, a citizen of the United States, residing at Edgewood, in the county of Allegheny and State of Pennsylvania, have invented new and useful Improvements in Safety-Car-Control Equipments, of which the following is a specification.

This invention relates to fluid pressure brake controlling devices, and more particularly as adapted for use with safety car control equipments.

One object of my invention is to provide an improved brake valve device for controlling the application and release of the brakes and means for throwing the brake valve handle to emergency position upon its release by the operator.

Another object of the invention is to provide means operated upon a predetermined reduction in main reservoir pressure for preventing loss of the main reservoir pressure.

Other objects and advantages will appear in the following more detailed description of the invention.

In the accompanying drawing; Fig. 1 is a diagrammatic view, partly in section, of a fluid pressure brake equipment, embodying my invention, and Fig. 2 a vertical elevation of a portion of the brake valve device, partly in section.

As shown in the drawing, the equipment may comprise an emergency valve device 1, a brake cylinder 2, and a brake valve device 3 at each end of the car.

The emergency valve device 1 may comprise a casing having a piston chamber 4, connected to the emergency brake pipe 5 and containing a piston 6, and a valve chamber 7, connected to a main reservoir 8 and containing a slide valve 9 adapted to be operated by piston 6.

Each brake valve device 3 may comprise a valve body containing the usual rotary slide valve (not shown) for controlling the application and release of the brakes and having a stem 10 for operating the valve.

A removable handle 11 is provided for operating the stem 10 and rotatably mounted on the stem 10, is a gear disk 12 having teeth adapted to mesh with the teeth of a gear segment 13.

The segment 13 is pivotally mounted on the valve body and at an intermediate point is connected to a piston stem 14 of a piston 15. One side of the piston 15 is connected to a pipe 16 and the other side is subject to the pressure of a coil spring 17.

The gear disk 12 is provided with a lug 18 adapted to engage the handle 11.

The pipe 16 is connected to a chamber 19 in a valve casing 20 and mounted in said valve casing are two valves 21 and 22 normally acted upon by a spring 23 so as to hold the valve 21 closed and the valve 22 open but adapted to be operated by pressing a knob on pedal 24 so as to close the valve 22 and open the valve 21. The opening of valve 21 connects the main reservoir pipe line 25 with chamber 19 and pipe 16, so that fluid under pressure will be supplied to piston 15.

The brake valve device may have positions as indicated on the drawing, namely; release, lap, handle off, service, and emergency application.

In operation, the main reservoir 8 being charged with fluid under pressure in the usual manner, fluid is supplied to the valve chamber 7 of the emergency valve device 1.

The emergency brake pipe 5 and piston chamber 4 are charged from valve chamber 7 through a port 26 in piston 6 and also through ports in the brake valve when the brake valve handle is in release position, fluid under pressure being supplied to the brake valve through the main reservoir pipe line 25.

Said main reservoir line may be charged directly from the valve chamber 7, but according to one feature of my invention, means are interposed between the main reservoir and the main reservoir pipe line for preventing the flow of fluid from the main reservoir to the main reservoir line when the pressure in the main reservoir falls to a predetermined degree.

For this purpose, a valve piston 27 is provided, which is subject on one side to the pressure of a spring 28 and on the opposite side of the pressure in valve chamber 7, as supplied through passage 29.

The spring 28 tends to seat the valve piston 27 and when the fluid pressure from valve chamber 7 acting on the seated area of the valve piston, exceeds a predetermined degree, the valve piston is lifted off its seat, and fluid from the valve chamber 7 is permitted to flow to passage 30 and past check valve 31 to the main reservoir pipe 25.

Normally, the spring 17 acts on piston 15 and tends to shift the gear segment 13 and the disk 12, so that the lug 18 tends to move the handle 11 around to emergency position and in order to prevent this movement, the operator must hold the handle.

If the operator holds the handle 11 in release position, the brake cylinder 2 is connected to the exhaust through cavity 32 in the emergency slide valve 9 and straight air pipe 33.

A straight air application of the brakes may be made by moving the handle 11 to service position, in which fluid under pressure is supplied to the straight air pipe 33 and through cavity 32 to the brake cylinder 2.

If the operator should release or let go of handle 11, the spring 17 will act through the segment 13, the gear 12, and lug 18 to move the brake valve to emergency position, in which fluid is vented from the emergency brake pipe 5, and the piston 6 is thereby shifted to emergency position, moving the slide valve 9, so that fluid under pressure is supplied from valve chamber 7 and the main reservoir 8 to the brake cylinder 2, to effect an emergency application of the brakes.

If the operator wishes to prevent an emergency application of the brakes when he releases the handle 11, he may do so by pressing the pedal 24 so that the valve 22 is closed and the valve 21 is opened. Fluid is then supplied to the piston 15 so that said piston is held to its outer seat against the force of spring 17, thus preventing the movement of the brake valve handle to the emergency position upon release by the operator.

The valve piston 27 is normally maintained in its open position for supplying fluid from the main reservoir to the main reservoir line 25, but should the main reservoir pressure fall to a predetermined degree, the spring 28 will operate to move the valve piston to its closed position, so that the main reservoir line is cut off from the main reservoir and fluid under pressure in the main reservoir will be available in case an emergency application of the brakes is made.

The handle may be removed in the handle off position without causing an emergency application of the brakes, since the rotary valve of the brake valve will remain in the position to which the brake valve handle is turned in order to remove same, for the reason that the force of the spring 17 acts only through the handle to turn the rotary valve, the disk 12 being rotatable on the valve stem 10, and said disk being moved by the spring when the handle is removed to the position shown at the right of Fig. 1, without moving the valve stem 10.

With a double ended equipment, the above provision is of special importance, since it would not be desirable to leave the brake valve at the non-operating end in emergency position, in which fluid is vented from the emergency brake pipe.

At the same time, if the operator desires to leave one end of the car, it is preferable that the brakes be applied and therefore means may be employed for preventing the removal of the brake valve handle in the handle off position unless the brakes have been applied, similar to that disclosed in Patent No. 1,143,334 of Walter V. Turner, dated June 15, 1915, and the pending patent application of Thomas H. Thomas, Serial No. 323,272, filed September 12, 1919.

Having now described my invention, what I claim as new and desire to secure by Letters Patent, is:

1. In a brake valve device, the combination with a valve stem, of a removable handle for operating said valve stem to effect an application of the brakes and spring actuated means acting on said handle and tending to move same to the position for applying the brakes.

2. In a brake valve device, the combination with a valve stem, of a handle for operating said valve stem to effect an application of the brakes and having a position in which the handle is removable from the valve stem and spring actuated means acting through said handle for moving the valve stem to brake application position, so that the removal of the handle in the handle off position will prevent an application of the brakes.

3. In a brake valve device, the combination with a valve stem, of a handle for operating said valve stem to effect an emergency application of the brakes and having a handle off position and spring actuated means acting on the handle and tending to move the valve stem to emergency application position, said means being inoperative to move the valve stem when the handle is removed in the handle off position.

4. The combination with a brake valve device having an operating handle and means for moving said handle to effect an emergency application of the brakes upon release of the handle, of a manually operated device for rendering said means inoperative to move said handle upon release of the handle.

5. The combination with a brake valve device having an operating handle and a spring actuated means tending to move the handle to effect an application of the brakes upon release of the handle, of a piston operated by fluid under pressure for rendering said means inoperative and a manually operated valve device for controlling the fluid pressure on said piston.

In testimony whereof I have hereunto set my hand.

CLYDE C. FARMER.